March 4, 1941.  G. E. MASON  2,234,054
METHOD OF AND APPARATUS FOR MAKING SAUSAGES
Filed Feb. 8, 1939  5 Sheets-Sheet 1
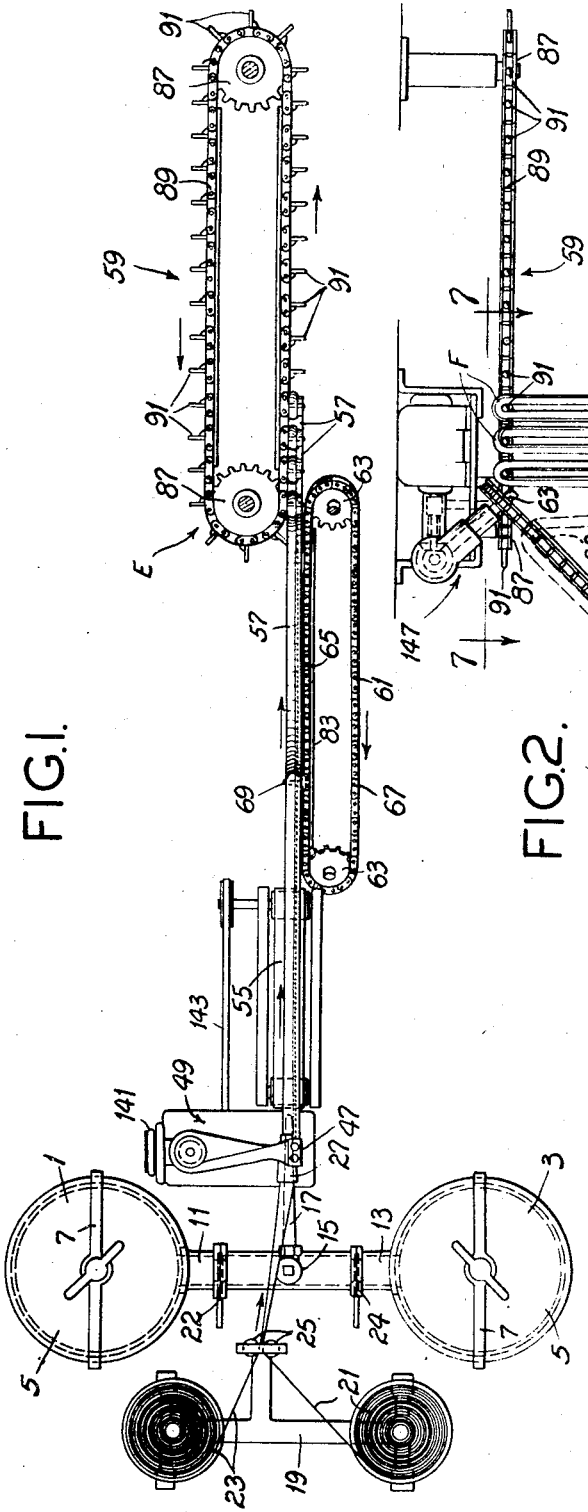
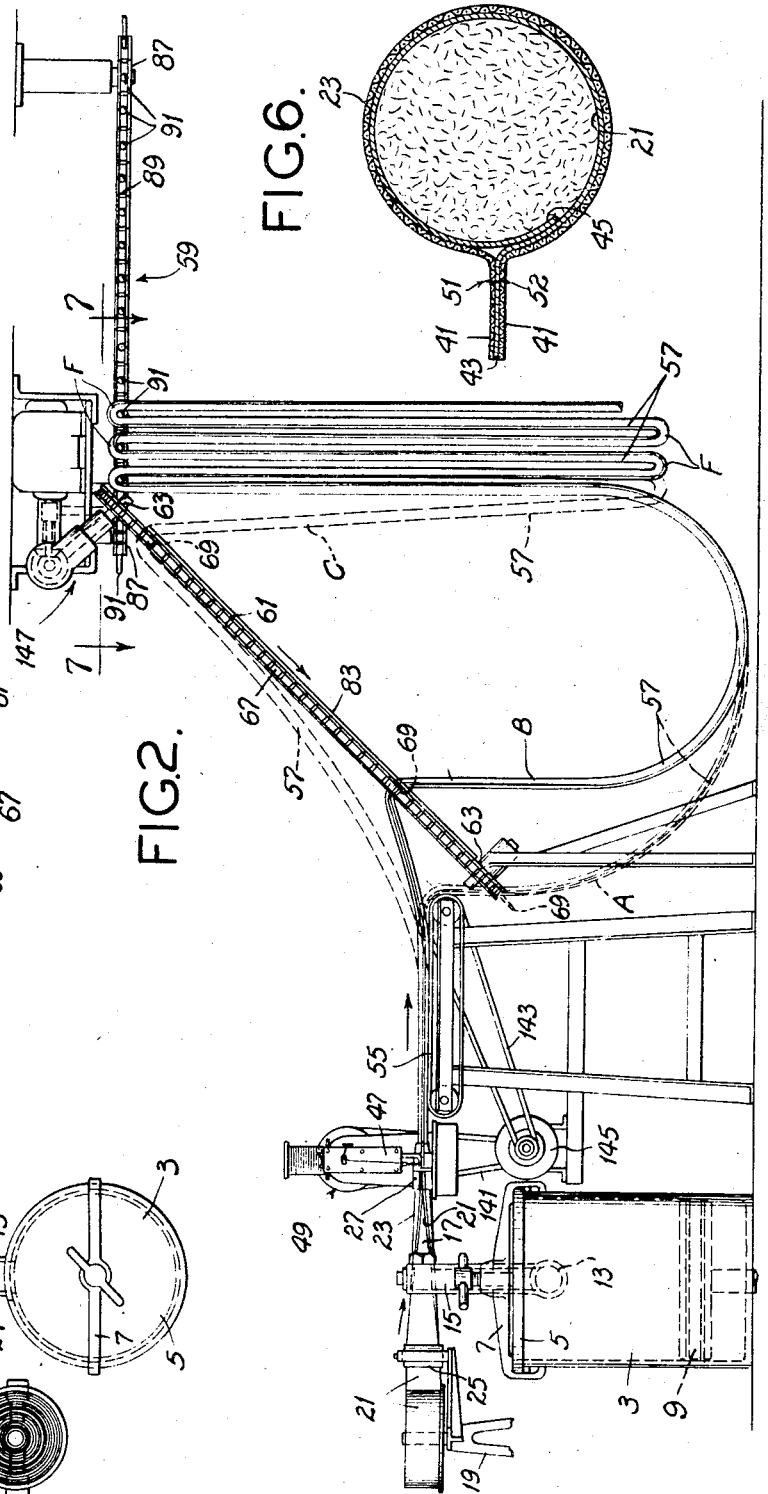
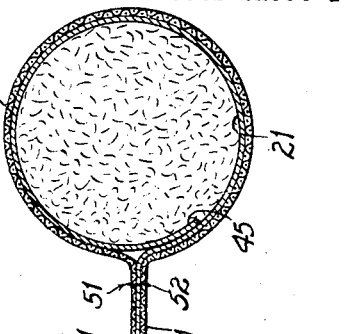
Glenn E. Mason, Inventor
Haynes, Koenig and Wolf. Attorneys.

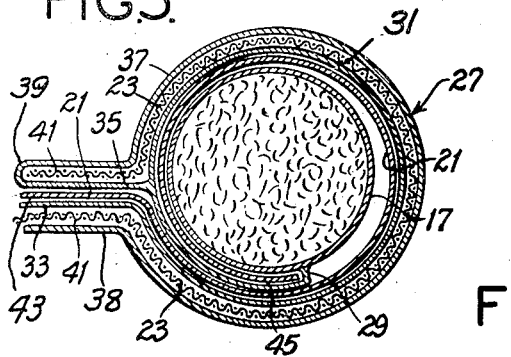
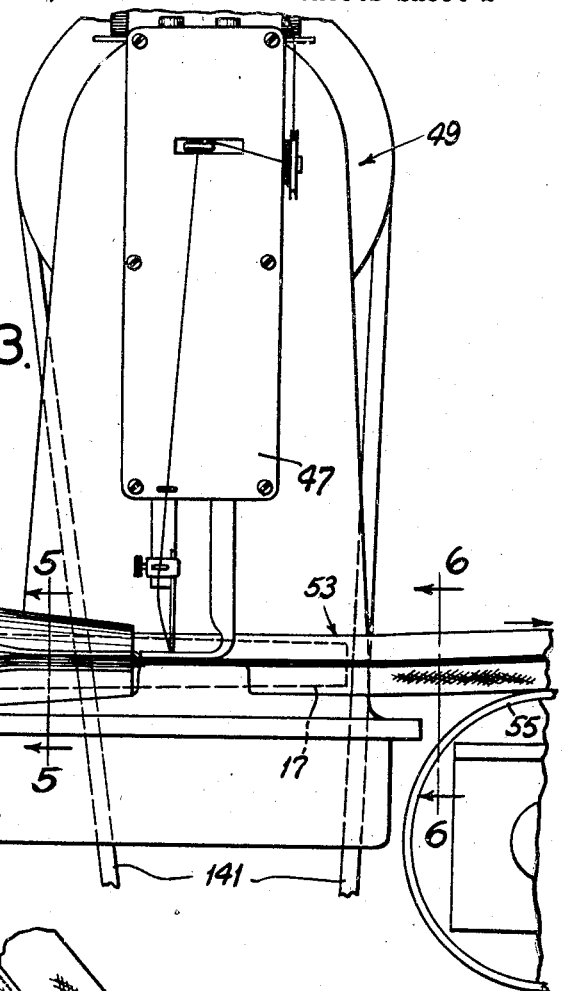
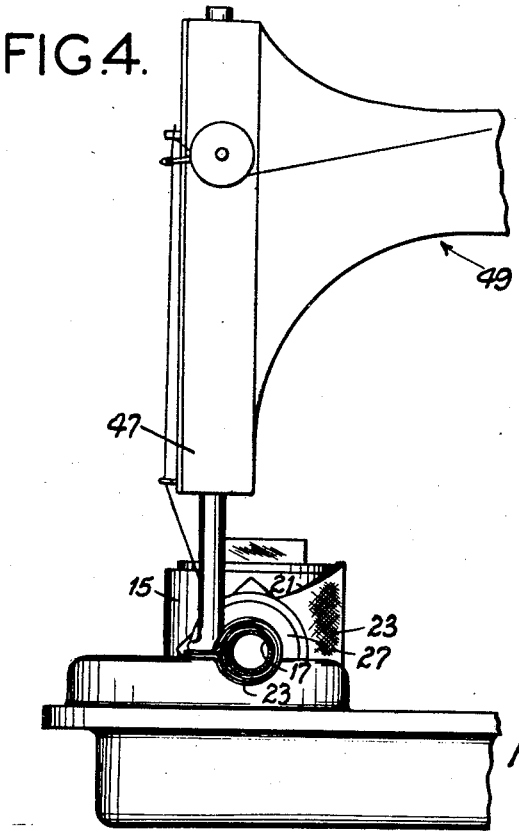
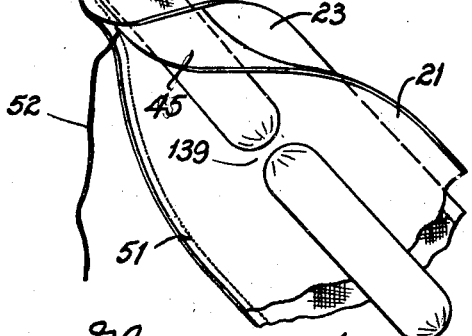

March 4, 1941. G. E. MASON 2,234,054
METHOD OF AND APPARATUS FOR MAKING SAUSAGES
Filed Feb. 8, 1939 5 Sheets-Sheet 3
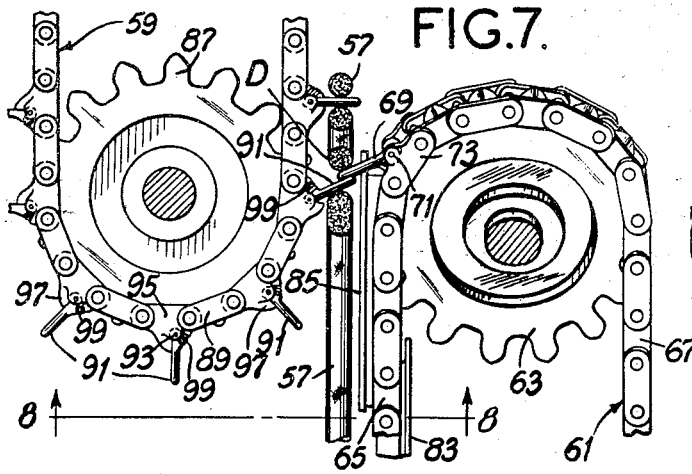
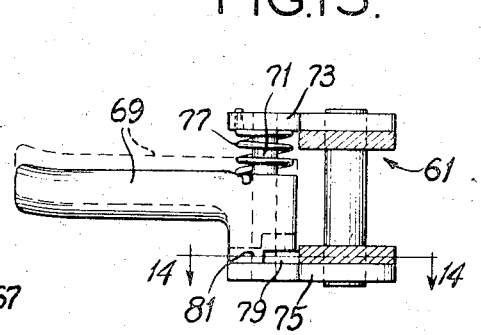
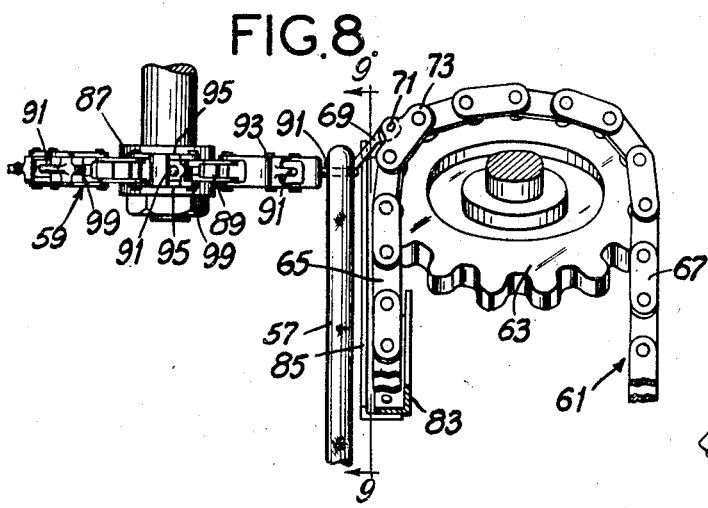
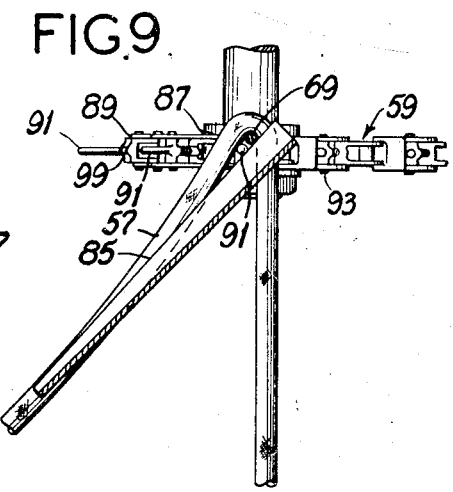
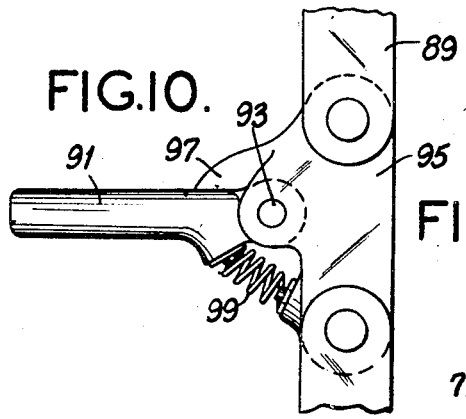
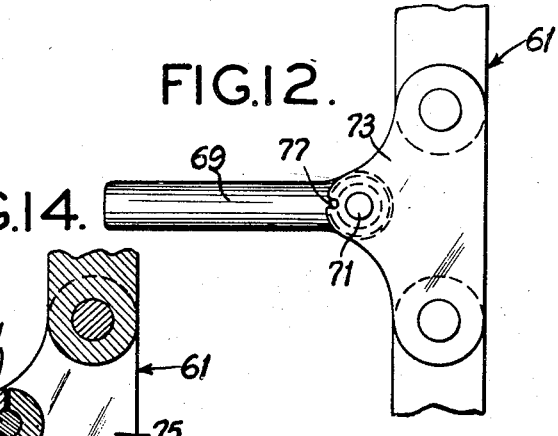
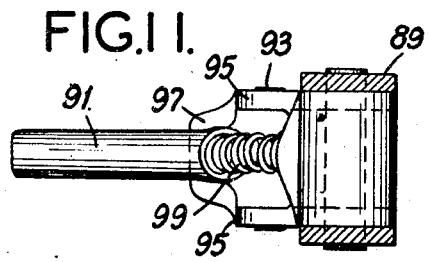
Glenn E. Mason, Inventor.
Haynes, Koenig and Wolf
Attorneys March 4, 1941.　　　　　G. E. MASON　　　　　2,234,054
METHOD OF AND APPARATUS FOR MAKING SAUSAGES
Filed Feb. 8, 1939　　　5 Sheets-Sheet 4

Glenn E. Mason,
Inventor.
Haynes, Koenig and Wolf.
Attorneys.

March 4, 1941.   G. E. MASON   2,234,054
METHOD OF AND APPARATUS FOR MAKING SAUSAGES
Filed Feb. 8, 1939   5 Sheets-Sheet 5
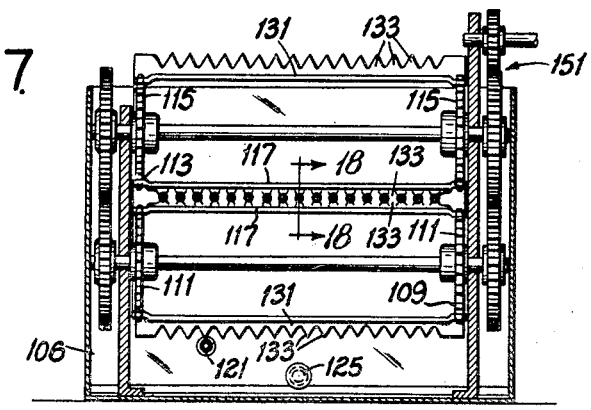
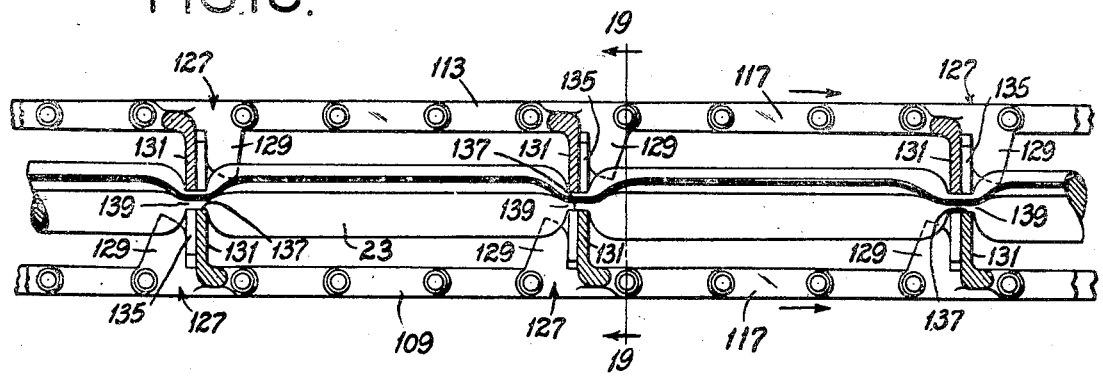
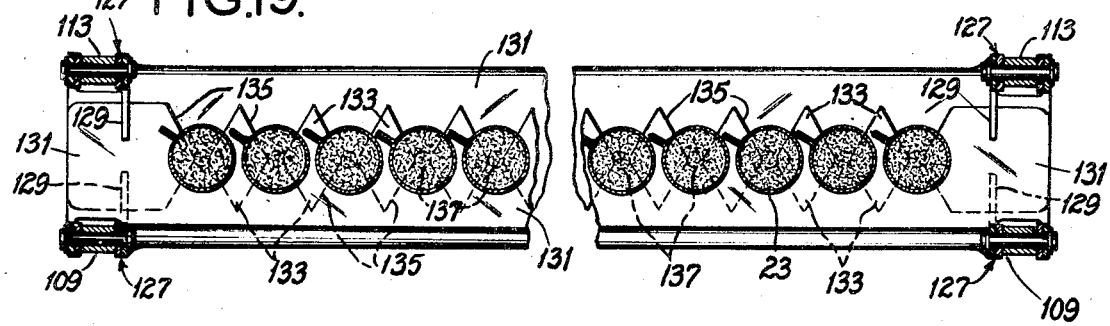
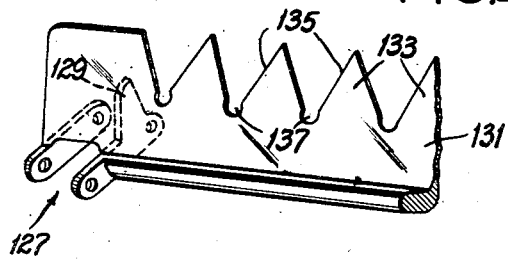

Patented Mar. 4, 1941

2,234,054

UNITED STATES PATENT OFFICE 2,234,054

METHOD OF AND APPARATUS FOR MAKING SAUSAGES

Glenn E. Mason, St. Louis County, Mo.

Application February 8, 1939, Serial No. 255,227

17 Claims. (Cl. 17—45)

This invention relates to a method of, and apparatus for, making sausages, and with regard to certain more specific features, to such a method and apparatus for making skinless sausages.

Among the several objects of the invention may be noted the provision of a method of, and apparatus for, making sausages in which the process is carried out substantially continuously, whereby rate of output may be increased; the provision of apparatus for carrying out the process in which the primary operations are automatic; the provision of a method and apparatus in which the sausage is molded in a novel manner to provide a finished, attractive and sanitary product; and the provision of apparatus of the class described in which the most expensive part of the molding casing may be used repeatedly while the least expensive part is renewable for sanitary purposes. Other objects will be in part obvious and in part pointed out hereinafter.

The invention accordingly comprises the steps and sequence of steps, elements and combinations of elements, features of construction, and arrangements of parts which will be exemplified in the structures hereinafter described and the scope of the application of which will be indicated in the following claims.

In the accompanying drawings, in which is shown one of various possible embodiments of the invention, Fig. 1 is a top plan view of a filling and supporting unit;

Fig. 2 is a front elevation of the apparatus shown in Fig. 1;

Fig. 3 is an enlarged front elevation showing details of a stuffing horn and sewing machine;

Fig. 4 is a right-hand elevation of Fig. 3;

Fig. 5 is an enlarged vertical section taken on line 5—5 of Fig. 3;

Fig. 6 is an enlarged vertical cross section taken on line 6—6 of Fig. 3;

Fig. 7 is a fragmentary, enlarged, horizontal cross section taken substantially at line 7—7 of Fig. 2, but showing the parts in a position advanced with respect to their Fig. 2 positions;

Fig. 8 is a vertical section taken on line 8—8 of Fig. 7;

Fig. 9 is a fragmentary detail section taken on line 9—9 of Fig. 8;

Fig. 10 is an enlarged plan view of a receiving lug used in connection with the apparatus shown in Fig. 7;

Fig. 11 is an elevation of Fig. 10, viewed from the bottom of Fig. 10;

Fig 12 is a plan view of a delivery lug shown in Fig. 7;

Fig. 13 is an elevation of Fig. 12, viewed from the bottom of Fig. 12, showing in dotted lines a displaced position of parts;

Fig. 14 is a fragmentary horizontal section taken on line 14—14 of Fig. 13;

Fig. 17 is a vertical section taken on line 17—17 of Fig. 16;

Fig. 18 is an enlarged fragmentary vertical section taken on line 18—18 of Fig. 17;

Fig. 19 is a vertical section taken on line 19—19 of Fig. 18;

Fig. 20 is a fragmentary perspective view of a segmentation plate; and,

Fig. 21 is a plan view illustrating a final step in removing processed sausages from their common skin.

Similar reference characters indicate corresponding parts throughout the several views of the drawings.

Figure 15:
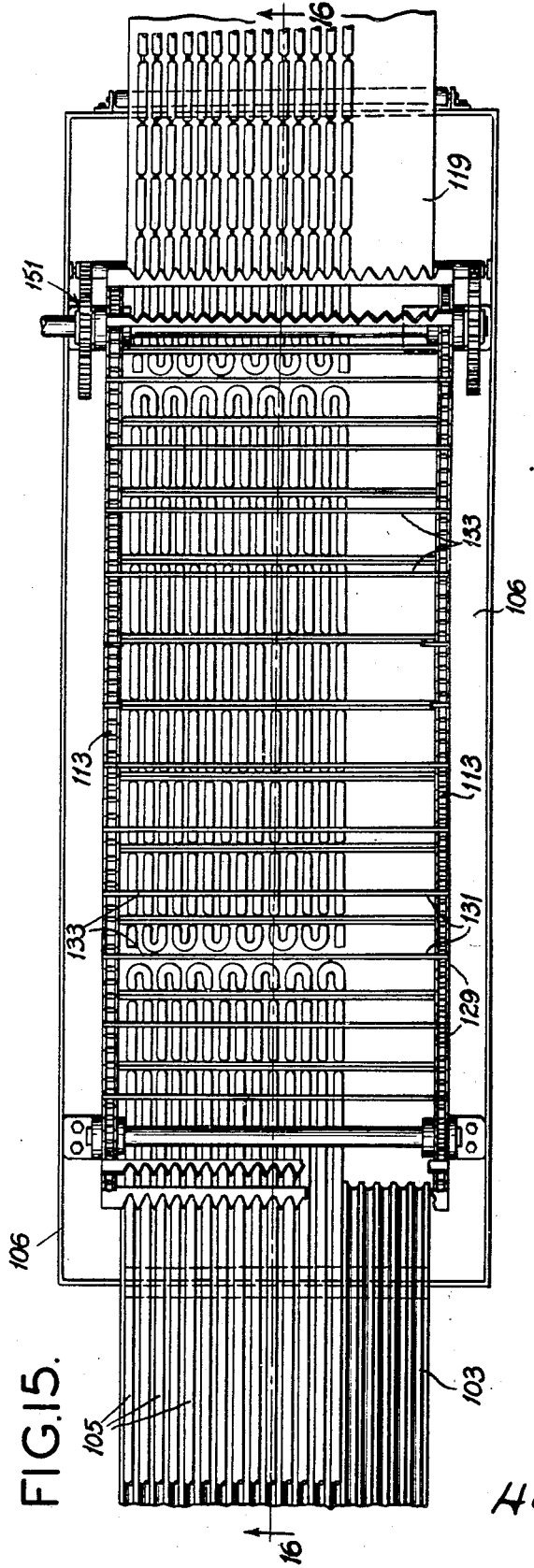
Fig. 15 is a plan view of segmentation apparatus, used subsequently to the apparatus shown in Figs. 1-14.

The method and apparatus herein described is adapted to making either skinless sausages or those with skins. For purposes of description, the apparatus will be shown in connection with the manufacture of skinless sausages, since the manufacture of sausages with skins simply involves fewer steps, as will be noted at the proper point in this description.

Referring now more particularly to Figs. 1 and 2, there are shown at numerals 1 and 3 a pair of containers for ground sausage meat. The meat is in its usual consistency and of the proper materials for the particular type of sausage to be made.

The containers 1, 3 have lids 5 held in position by means of clamps 7. They have located therein rams 9 which force the sausage meat through outlets 11 and 13 respectively to a common inlet 15 of a stuffing nozzle or horn 17. Valves 22 and 24 serve to isolate one container or the other, so that flow may be alternately carried out from the respective containers. Thus, while one container is being emptied, the other may be re-filled so that a continuous flow of sausage meat may be delivered to the inlet 15 and out of the stuffing or forming horn 17.

At 19 is shown a rack for supporting spools of strip paper 21, and strip cloth 23. The paper 21 may be of the smooth waxed variety, one of its functions being to lie temporarily adjacent the sausage meat and which is adapted to be stripped from said meat after the forming operations have been completed. The paper provides a fine finish on the sausage meat which is later to appear as a skinless sausage. It will thus be seen that for the waxed paper may be substituted other smooth materials, such as "cellophane" or the like. If a rough finish is desired, a correspondingly rough paper may be used.

The strip 23 is preferably composed of a woven fabric which will withstand repeated use and laundering, such as canvas, linen, cotton or the like.

As shown, the paper strip 21 and the cloth strip 23 are withdrawn from spools and brought adjacent one another by means of rollers 25, from whence the materials 21 and 23 pass to a tube former indicated generically at numeral 27. This former 27 is attached to the horn 17 at 29 (see Fig. 5). From this point, it is formed as an inner clockwise spiral loop 31 which extends around to an edge lip 33. Within this spiral loop 31 is drawn and formed the paper 21 having an edge 43 at the lip 33.

Attached to the spiral loop 31 at 35 is a second clockwise and outer spiral loop 37 which includes therein a channel section 39 and a lip 38. The section 39 is adjacent the lip 33. Within this spiral loop 37 is carried the cloth 23 having one edge 41 in the channel section 39 and another edge 41 between lips 33 and 38.

Both edges 41 of the cloth 23 emerge from the former 27 adjacent one another, as indicated, for the purpose of being sewed together at a seam 51 by means of a thread 52. One edge 43 of the paper 21 also emerges from the former sandwiched and sewn in between the edges 41 of the cloth 23, also by thread 52. However, the other edge 45 of the paper 21 remains free of the subsequent sewing operation and exists as a free inner flap which covers the seam 51 to form a smooth, all-paper surface for the sausage meat thereafter to be stuffed into the tubular casing.

Thus, the adjacent edges 41 of the cloth 23 with the sandwiched edge 43 of the paper 21 emerge from the former 27. These three edges 41 and 43 pass beneath the head 47 of a sewing machine 49, by means of which a seam of chain stitching 51 is caused to join said edges so that the cloth is formed in a circular loop, as shown in Fig. 6, with an inside liner of paper 21 having a free edge 45 which overlaps the seam 51 to provide a smooth waxed-paper interior for the resulting casing. This casing slips off the horn 17 at the point indicated at 53 (Fig. 3), where the sausage meat is injected to fill the continuously formed casing.

The sewed, filled casing then proceeds to a moving belt 55 whereon it is supported and by means of which it is drawn through the sewing machine and carried out to a loop such as indicated at 57 in Fig. 2. A first position of this loop 57 is shown in dotted lines at A; a second position in solid lines at B; and a third position in dotted lines at C.

The next step is to move this loop 57 through the successive positions A, B and C to hang the continuous length of stuffed casing in a skein upon a travelling rack, indicated generally at numeral 59. This is accomplished as follows, referring to Figs. 1, 2 and 7–14:

A sloping chain 61 is supported upon sloping sprockets 63. The plane of slope is such that, when the chain 61 is driven, the rear reach 65 moves up, and the front reach 67 moves down. The chain 61 carries a single lug 69 which is made as illustrated in Figs. 12 and 13. This lug is rotatable on a pin 71 which is carried on plates 73 and 75 of the chain 61. A spring 77 which is of the combination compression and torsional type pushes the lug 69 downwardly and tends to retain it in a centered position normal to the chain, as indicated in Fig. 12. On the other hand, the lug 69 can move from the solid line position to the dotted line position shown in Fig. 13, against the compression of the spring 77. The upper part of the plate 75 and the lower part of the lug 69 are provided with dogs 79 and 81, respectively. The dog 81 and the dog 79 each occupy about an 180° arc, shown in Fig. 14. From the above, it will be seen that normally the lug 69 is pressed down by the spring 77 so that the dogs 81 and 79 are adjacent the pin rigidly normally to the skein during the upper travel upon the rear reach 65.

The rear reach 65 of the chain lies in an angle iron 83 for support, and at the upper end of this angle iron 83 is formed a wedge-shaped cam 85, upon which the lug 69 rides upon its upward travel in the reach 65.

The purpose of the cam 85 is to raise the lug 69 to its dotted line position (Fig. 13) as the lug comes up to the top of its travel upon the reach 65 (Fig. 9), so that the lug 69 is no longer rigidly located in a normal position with respect to the chain, but becomes positioned so that if it meets a resistance it will swing back from a normal position to a sloping position such as shown in Fig. 7. The resistance which brings about this sloping position is a portion of the skein of sausage which has previously been hung upon the movable rack 59.

After the lug 69 moves from the cam 85, it springs out again into its normal position at right angles to the chain and again becomes rigidly connected thereto. In this condition it travels the descending reach 67 and picks up the loop 57 in about the condition at A in Fig. 2. The loop is then moved through the position B and up through the dotted line position C, also as indicated in said Fig. 2.

In order to receive the loop 57 from the lug 69, the travelling rack 59 is provided as follows: It consists of sprockets 87 carrying a horizontal chain 89 from which extend horizontal supporting lugs 91 (see Figs. 10 and 11). These lugs are pivoted at 93 to special links 95. They are held in radial position by means of stops 97 but may swing into angular positions against the reactions of springs 99.

The operation of transferring the loop 57 from support upon the upwardly travelling lugs 69, to support upon the horizontally travelling lugs 91 of the moving rack 59 is as follows:

Assuming that the loop 57 is in the upper position C (Fig. 2), the lug 69 in progressing further upward causes the depending part of the loop 57 to advance ahead of the adjacent lug 91 on the moving rack 59. Lug 91 gives way under the forward motion of said depending part (marked D in Fig. 7) and then springs back to become positioned under the loop. At this juncture the lug 69 rides up upon the cam 85 and thus becomes unlocked, and in swinging out around the upper sprocket 63 of the chain 61 deflects backward from behind the portion D and allows the loop to drop upon the lug 91, which then supports said loop for further horizontal movement. The unloaded lug 69 then travels on down the front reach 67 of the chain 61, having sprung back into normal rigid position. The motion of the lugs 69 and 91 is so timed that one complete movement of the lug 69 around its circuit corresponds to an advance of a given lug 91 the distance between adjacent lugs 91.

From the above, it will be seen that the string of sausage is looped on the continuously travelling supporting hanger 59 to form a looped skein. The number of loops may be repeated until the first one in a skein appears at about point E (Fig. 1). The skein needs then to be cut at a suitable point and removed, to be placed in a smoke house for a suitable length of time.

The next step in the process is to send the skeins through the apparatus illustrated in Figs. 15-20 which divides the sausage meat enclosed in the tubular casings into segments or individual sausages. From the smoking racks the skeins are placed on a corrugated receiving board 103 which extends into a processing vat 106, the corrugations of the receiving board 103 being to guide the skeins into the processing vat 106. This vat carries a charge of hot processing water 107 at a temperature of the order of 160° F. or so. Fresh water enters at an opening 121 and water leaves at an overflow 123, the water being heated by steam jets 125.

Within the vat 106 is mounted a pair of lower chains 109 on lower sprockets 111 and a pair of upper chains 113 on upper sprockets 115. The adjacent reaches 117 of the chains move in the same direction, that is, from the board 103 toward a conveyor belt 119 at the rear of the vat 106. The elevation of the reaches 117 is such as to maintain them immersed in the water 107.

The chains 109 and 113 are provided at intervals with special links 127, each pair of which is formed with lugs 129 and a segmenting plate 131. The segmenting plates 131 extend outward from the respective chains 109 and 113. Each one is carried by a pair of chains. Adjacent plates, as they come into position next to one another at the reaches 117, are guided by the opposite lugs 129, so that the plates 131 are finally locked closely together in a parallel relationship.

Each segmenting plate 131 is provided with serrations 133 the purpose of which is to provide tapered receiving notches 135 having circular bottom seats 137. Thus, as any given pair of plates 131 approach one another at point G, they provide first a relatively large opening at their spaces 135. These openings gradually become smaller and form a stricture around the sausage, until only small circular openings are left, such as 139. These openings are so small that the meat in the sausage is pinched off, all of the circular passage being filled by the paper and cloth skin, including the seam 51. Figs. 17-19 illustrate the point.

The pinching of the sausage meat occurs as the lengths 105 are introduced between the reaches 117 and occurs at the beginning of the cooking process. The speed of advance of the chains at 117 is such as to consume about ten minutes in proceeding through the cooking vat. During this processing, the meat becomes coalesced so that, if the temporary skin 21, 23 is thereafter removed, the resulting segmented sausages will hold their shapes individually, as will appear. It is to be understood that the time and temperature of processing may be varied to suit particular products and conditions.

Finally, the segmented, but still wrapped and linked, sausages move out upon the belt 119, the segmenting plates 131 separating at the rear sprockets to bring this about.

The belt 119 being sloped at one end lifts the sausage clear of the processing water 107. On the belt 119 the sausage is treated as shown in Fig. 21. Here the seaming thread 52 of the seam 51 may be unraveled. This is a simple procedure, because the stitching is of the chain stitch type which unravels when cut at a given point and simply pulled. After cooling the sausages may be boxed.

It will be understood that if desired cooling may be carried out before unravelling the seam. In this event the string of sausages may be hung upon racks and thus sent to a cooler. They may then be unraveled and boxed directly.

In Fig. 21 is shown how the strip of paper 21 comes off separate from the strip of cloth 23. The paper is then thrown away, while the strip of material 23 may be sent to the laundry, rewound on a spool, and remounted upon the bracket 19 for subsequent re-use. The amount of repetitious use which may be made of the strip 23 depends upon the wear introduced by repeated stitchings, but a given strip may be used many times. On the other hand, each sausage is always molded in fresh waxed paper.

The use of a strip of waxed paper, with the paper lapping the cloth seam, results in a pleasing surface texture throughout the entire sausage surfaces.

Having been cooked, the sausages remain integrated and are sold skinless. The pinching action during segmentation makes pucker marks at the ends of the sausages so that they appear normal to customers, although actually skinless.

The outer holding textile material 23 serves to provide tension against pressure introduced by squeezing in the segmenting apparatus. This tension against the expansive pressure of the meat serves to provide a well filled-out surface.

At numeral 141 (Figs. 1 and 2) is shown a drive for the sewing machine 49 and at numeral 143 is shown a drive for the belt 55. These are driven from a motor 145.

Figure 16:
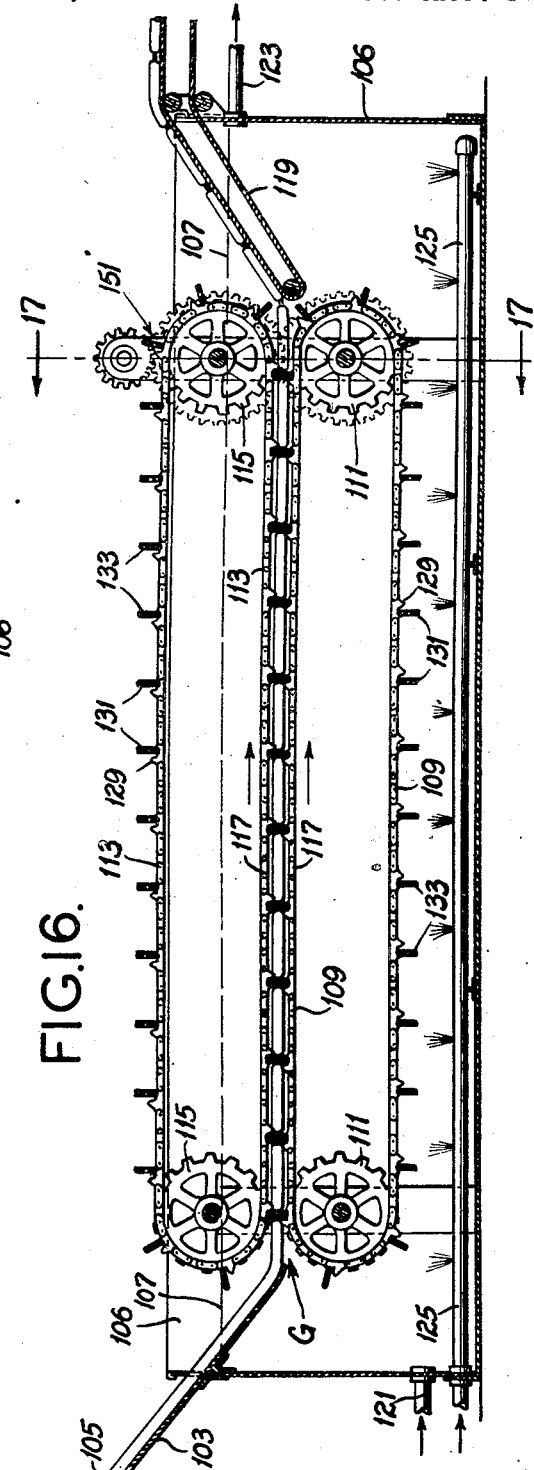
Fig. 16 is a central longitudinal section taken on line 16—16 of Fig. 15.

The drive for the chains 61 and 89 is shown at 147 (Figs. 1 and 2). The drive for the segmenting apparatus of Figs. 15-17 is indicated at 151.

It may be noted that the process is available for producing sausage in the skin, as well as skinless sausages. This can be accomplished by providing the usual type of edible (or the described inedible) skin in connection with the filler horn 17 and permitting this to progress through the segmenting machine of Figs. 15-20, and then, instead of unwrapping the processed segmented sausages on the belt 119, they may be removed without skinning to be sold in concatenations. They are then reopened at the seam prior to eating, as in the kitchen or on the table, the skin being removed. In such case, an advantage of the invention lies in the savings brought about by the new segmenting machine and method.

Another advantage of the invention is in the fact that the waxed paper 21 leaves some of its film of wax upon the surface of the sausage, thus providing a preservative surface during the period of marketing. The surface also has a very desirable smooth appearance.

It is clear that either motor 145 or 147 may be eliminated and its driven parts driven from the other, or that the motors may be synchronized, if desired.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A method of sausage making comprising continuously forming a skin, moving the skin as it is made, forcing sausage meat into the skin as it moves, arranging the skin with parallel lengths, moving said parallel lengths through a processing compartment, and pinching said lengths at predetermined distances thereon as they move, said pinching being to a degree to separate the meat into segments in the skin without separating the skin into segments.

2. A method of making sausage skin comprising supplying a continuous forming strip and a liner strip, bringing said strips adjacent one another and tubularly forming them with the liner strip inside, and sewing opposite edges of the forming strip and one edge of the liner strip, said liner strip being positioned to form a liner for the forming strip, the unsewn edge of the lining strip lapping the seam formed by the sewn portions.

3. A method of sausage making comprising moving a forming strip and a liner strip from continuous supplies, continuously bringing said strips adjacent one another with the liner strip inside and forming them and joining opposite edges of the forming strip and one edge of the liner strip to contain the liner strip as a liner, continuously forcing sausage meat into the lined tube thus formed, pinching the stuffed tube to segment the meat therein, and setting the segmented meat by processing it in the tube.

4. A method of sausage making comprising moving a forming strip and a liner strip from continuous supplies, continuously bringing said strips adjacent one another and tubularly forming them and joining them to form a tube so that the liner strip forms a liner for the forming strip, continuously forcing sausage material into the lined tube thus formed, pinching the tube to segment the meat therein, setting the material by processing it in the tube after segmentation, and removing the tube from the segmented material.

5. A method of sausage making comprising the provision of a continuous supply of a textile forming strip and a non-textile liner strip, continuously bringing said strips adjacent one another and forming them and seaming them to form a lined tube, continuously forcing sausage material into the tube, pinching the tube to segment the material therein, setting the material by processing it in the tube after segmentation, removing the form from the segmented and processed meat by re-opening the seam, and laundering the textile form for subsequent use.

6. A method of sausage making comprising the provision of a continuous supply of a forming material, continuously seaming the material to form a tube therefrom, continuously forcing sausage material into the tube thus formed, pinching the tube to segment the material therein, setting the material by processing it in the tube after segmentation, and removing the tube from the segmented and processed material by re-opening the seam.

7. Sausage making apparatus comprising a stuffing horn, a fabric former associated with said horn and adapted to receive strip fabric, means for drawing the fabric through the former whereby it is formed into a tube around the horn, and sewing means for sewing the opposite edges of the strip as it leaves the horn.

8. Sausage making apparatus comprising a stuffing horn, a composite fabric former associated with said horn and adapted to receive a plurality of strips, means for drawing the strips through the former whereby one is formed into a tube and the other into a liner for the tube, and means for maintaining the tubular form as it leaves the former.

9. Sausage making apparatus comprising a stuffing horn, a fabric former associated with said horn and adpted to receive strip fabric, means for drawing the fabric through the former whereby it is formed into a tube, sewing means for sewing the opposite edges of the strip as it leaves the former, and means for extruding sausage meat from said horn into the tube as the tube is formed.

10. Sausage making apparatus comprising a stuffing horn, means for drawing a liner strip and a forming strip adjacent one another and around and from the horn, a former associated with the horn to roll said strips into a tubular form, and means for attaching opposite edges of the forming strip and one edge of the liner strip as they leave the former, the other edge of the liner strip being left free to form a protection inside of the same thus formed.

11. Sausage making apparatus comprising a stuffing horn, means for drawing a liner strip and a forming strip adjacent one another and around and from the horn, a former associated with the horn to roll said strips into a tubular form, means for attaching opposite edges of the forming strip and one edge of the liner strip as they leave the former, the other edge of the liner strip being left free to form a protection over the seam thus formed, and means for continuously extruding sausage meat from said horn into the lined form as the form is made.

12. A sausage making method comprising drawing forth a forming strip, forcing said strip as it is drawn into a tubular shape, chain stitching the opposite edges of said forming strip to effect a tube, forcing sausage material into the sewed form, and subsequently opening the chain stitching and separating the form from the contained material.

13. A sausage making method comprising drawing forth a forming strip, forcing said strip into a tubular shape as it is drawn, sewing by means of chain stitching the opposite edges of said forming strip to effect a tube, extruding sausage material into the sewed form, and subsequently opening the chain stitching and separating the form from the material.

14. A sausage skin comprising an outer layer of flexible fabric, an inner layer of relatively smooth and flexible material, the outer material having its edges adjacent, one edge of the inner material and the two edges of the outer material being sewn, the inner material being looped and having its free edge covering the seam formed by the sewing.

15. A temporary sausage skin comprising an outer layer, an inner layer, the outer layer being looped with its edges adjacent, one edge of the inner material and the two edges of the outer material being sewn, the inner material being looped and having its free edge covering the seam formed by the sewing, said sewing being of the chain-stitch variety.

16. The method of forming sausages comprising forming a relatively strong fabric casing, forming a relatively smooth flexible liner in said casing, stuffing sausage material into said casing within the liner, segmenting the sausage material while within the casing by pinching the casing, processing the segmented material within the casing, separating the outer casing and its liner from the segmented and processed sausage, separating the liner from the fabric form, and laundering the form and re-using the form for the described purpose.

17. A method of sausage making comprising the provision of a continuous supply of flexible forming material, continuously flexing the material laterally and placing opposite edges adjacent to form a cylinder, joining said edges to form a tube, continuously delivering sausage material into the tube thus formed, pinching the tube to segment the material therein to form sausage units, setting the material by processing it in the tube after segmentation, and removing the tube from a segmented and processed sausage unit without damage to the unit by effecting reopening of the seam at the unit at any time prior to the eating of said unit.

GLENN E. MASON.